INVENTOR:-
JULIUS HARMAN

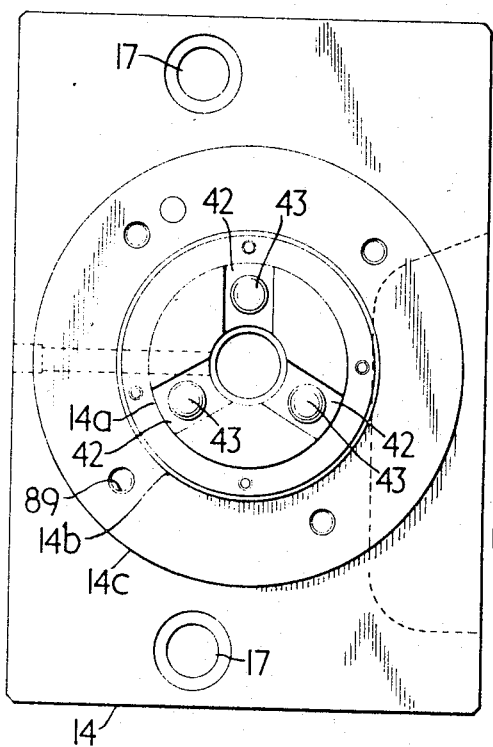
FIG. 4.
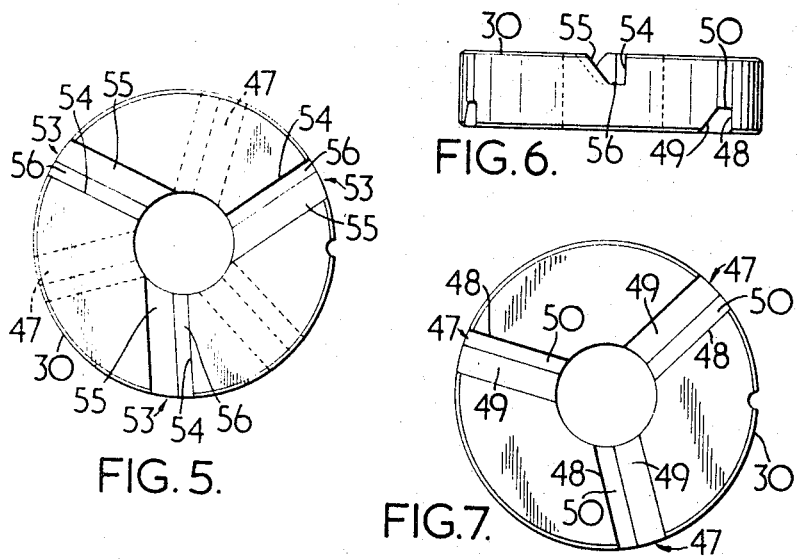
FIG. 5.
FIG. 6.
FIG. 7.
INVENTOR :-
JULIUS HARMAN

United States Patent Office 3,449,990
Patented June 17, 1969

3,449,990
MANUALLY INDEXABLE TURRET FOR A MACHINE TOOL
Julius Harman, Coventry, England, assignor to Alfred Herbert Limited, Foleshill, Coventry, England
Filed Apr. 24, 1967, Ser. No. 633,192
Claims priority, application Great Britain, Apr. 27, 1966, 18,380/66
Int. Cl. B23b 29/24
U.S. Cl. 82—36      7 Claims

ABSTRACT OF THE DISCLOSURE

A manually indexable turret has its tool holder held by a dog clutch in an indexed position. An arcuate movement of a handle in one direction releases the tool holder and indexes it to the next position, and a reverse movement of the handle re-engages the dog clutch.

---

The invention relates to a quick-acting manually indexable turret. Hitherto turrets of this kind have depended on the interaction of plungers and coacting bores for holding the tool holder in an indexed position, but as it is necessary for there to be working clearance between the plungers and bores, which clearance can increase with wear, the location of the tool after indexing is of a corresponding degree of accuracy, and, moreover, as the rotation of the turret to bring the next tool into position was arrested by the engagement of a plunger with a bore or a step, the plunger had to absorb the inertia of the turret as a shock load. Also the radial rigidity of a plunger located turret is low for heavy cutting conditions.

The object of the invention is a quick-acting manually indexable turret which is constructed and operated in such a manner that these disadvantages are mitigated.

According to the invention, a quick-acting manually indexable turret, for a machine tool, has the tool holder held in an indexed position by axially-separable coupling parts provided at adjacent sides with axially-interengageable means which automatically orientate the coupling parts into accurate relative angular positions, and the tool holder is indexed from one position to the next by an arcuate movement of a manually-operable handle successively through a first arc portion during which clamping pressure between all axially movable parts is relieved, through a second and consecutive arc portion during which the tool holder is released for subsequent operation to the next indexed position, through a third and consecutive arc portion during which the tool holder is raised to effect axial separation of the coupling parts, and through a fourth and consecutive arc portion during which the tool holder is first rotated to the said next indexed position and then caused to drop for the coupling parts to re-engage in accurate relative angular positions appropriate to the said next indexed position, a complete reverse arcuate movement of the handle causing the clamping pressure to be re-applied to the axially movable parts for locking the tool holder.

According to a further feature the handle is fast with a shaft extending through a bore in the tool holder and having a hub to bear on the latter, the shaft having an extending end with a screwthreaded connection with a sole plate of the turret for applying the clamping pressure.

According to a still further feature the axially interengageable means of the coupling parts are dog teeth having their flanks converging towards their crests for engagement in interdental spaces of the same shape of the coacting coupling part.

According to another feature an indexing ring slidably splined to the shaft is provided with peripheral cam surfaces which, during movement through the said second arc portion, urges coacting radial plungers into disengaging positions to free the tool holder for subsequent operation to the said next indexed position, but the tool holder is held against such indexing movement by the engagement of the two parts of the coupling.

According to still another feature, an axially-disengageable coupling between the indexing ring and a cam ring axially fast with the work holder, includes balls in respective radial grooves in the top of the sole plate engaging radial grooves in the adjacent face of the cam ring, the grooves in the latter having ramps to coact with the balls such that during movement through the said third arc portion the cam ring and, with it, the tool holder are raised to disengage the coupling parts and thus move the disengaged radial plungers axially on to a cylindrical surface to maintain them in the disengaged position while a fixed radial plunger within the work holder engages the indexing ring subsequently to rotate the work holder to the said next indexed position.

According to a still further feature a manually indexable turret, for a machine tool, comprises a tool holder, a sole plate and a manually-actuable hub, said tool holder disposed between said manually-actuable hub and said sole plate, a shaft axially fast with said manually-actuable hub, said shaft extending coaxially through said tool holder and having a screw-threaded connection with said sole plate, an indexing ring and a cam ring arranged about said shaft intermediate said manually-actuable hub and said sole plate, said cam ring rotatably but non-slidably connected to said work holder, said indexing ring slidably but nonrotatively secured to said shaft, uni-directional drive means between said indexing ring and said cam ring to drive the latter, said indexing ring provided with indexing surfaces, first plunger means supported radially of said tool holder and adapted to coact with said indexing surfaces of said indexing ring to hold said work holder against axial movement, second plunger means supported radially of said tool holder and adapted to coact with said indexing surfaces of said indexing ring to rotate the latter, axially-acting means between said cam ring and said sole plate, axially-separable tooth clutch elements respectively fast with said tool holder and said sole plate, and a thrust ring between said manually-actuable hub and said indexing ring; a movement of said manually-actuable hub through a first arc causing the screw-threaded connection between said shaft and said sole plate to release a clamping pressure on the tool holder applied during a previous operation, a further movement of said hub through a second and contiguous arc rotating said indexing ring to disengage said first plunger means therefrom, a still further movement of said hub through a third and contiguous arc causing said axially-acting means to raise said tool holder relatively to said sole plate with a consequent disengagement of said axially-separable toothed clutch elements and with a consequent raising of the disengaged first plunger means to rest on said thrust ring, and a still further movement of said hub through a fourth and contiguous arc during which said second plunger means indexes said tool holder firstly to the next position and then frees it to drop for permitting said tooth clutch elements to re-engage axially for holding the tool holder in the new indexed position; a reverse rotation of said hub causing the screw-threaded connection between said shaft and said sole plate to restore the clamping pressure.

Further features will become apparent from the following description.

In the accompanying drawings:
FIGURE 1 is an end elevation of one form of turret in accordance with the invention;
FIGURE 2 is a corresponding plan view;

FIGURE 4 is a plan view of a sole plate shown in FIGURE 3;

Figure 3:
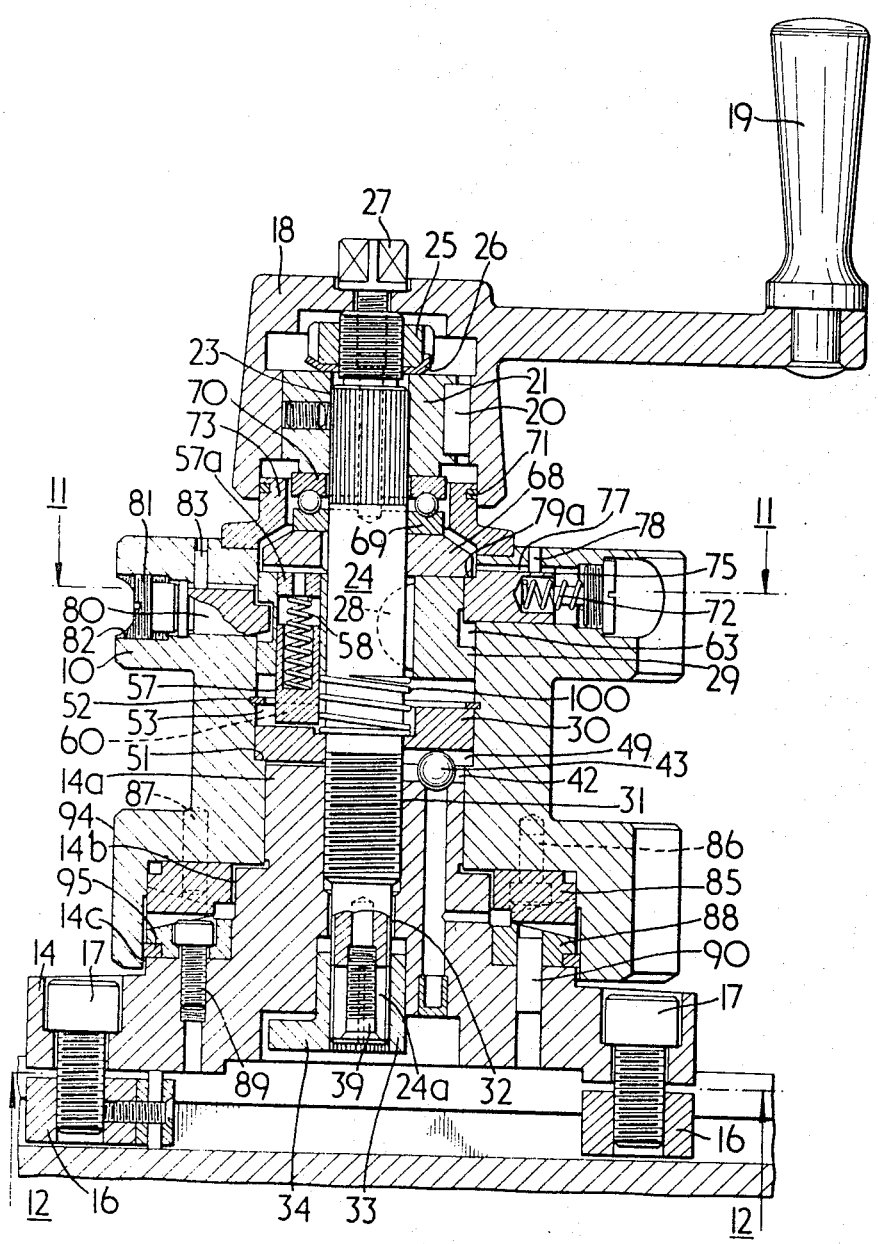
FIGURE 3 is a section on the line 3—3 of FIGURE 1 but showing an operating handle in another position.
Figure 8:
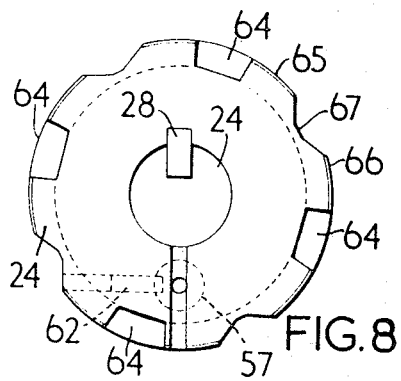
Figure 9:
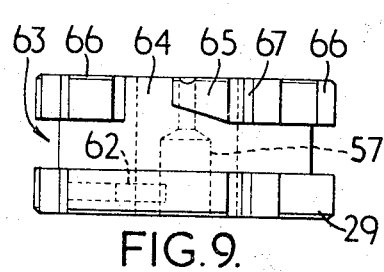
Figure 10:
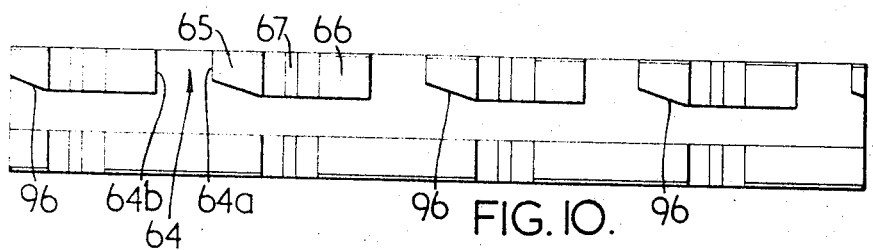
Figure 11:
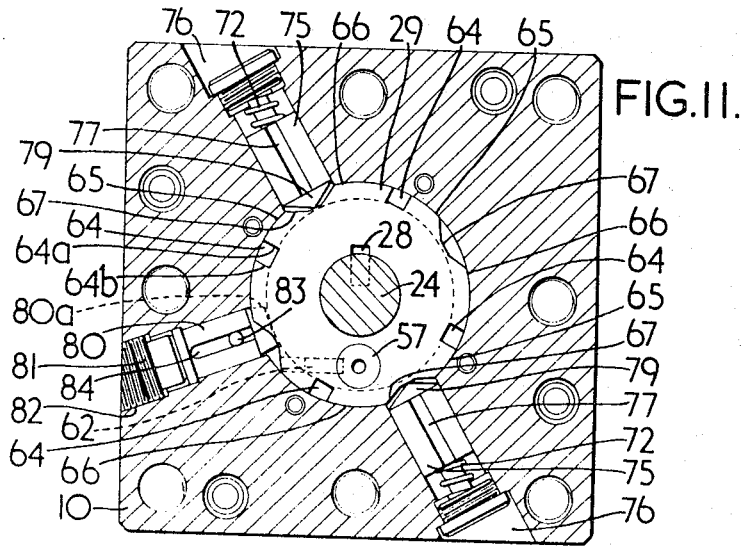
Figure 12:
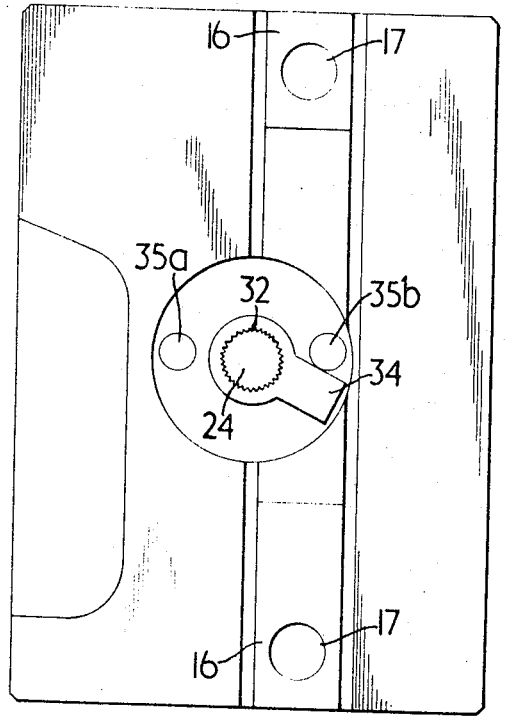

FIGURES 5, 6, and 7 are, respectively, a plan, side elevation and an underside plan of a cam ring shown in FIGURE 3;

FIGURES 8, 9 and 10 are, respectively, a plan, side elevation and a development of an indexing ring shown in FIGURE 3;

FIGURE 11 is a sectional plan view of the indexing ring and coacting parts on the line 11—11 of FIGURE 3;

FIGURE 12 is a section on the line 12—12 of FIGURE 3, and

Figure 13:
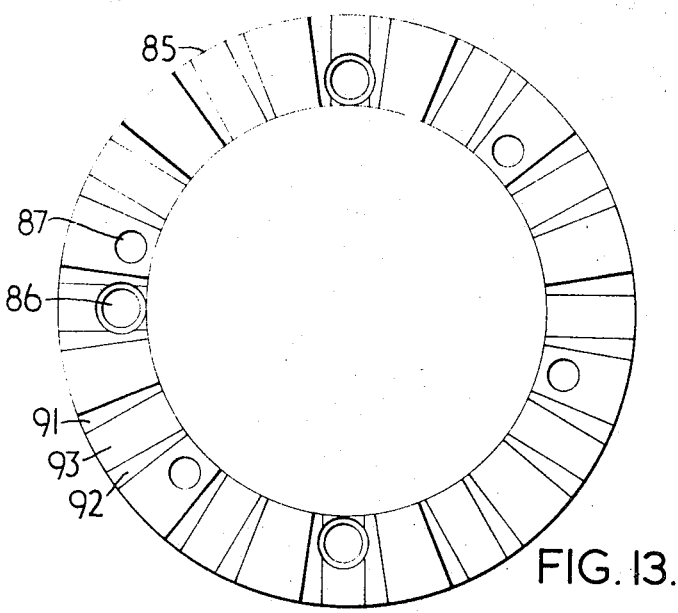

FIGURE 13 is a plan view of one of two identical, toothed coupling rings shown in FIGURE 4.

Figure 1:
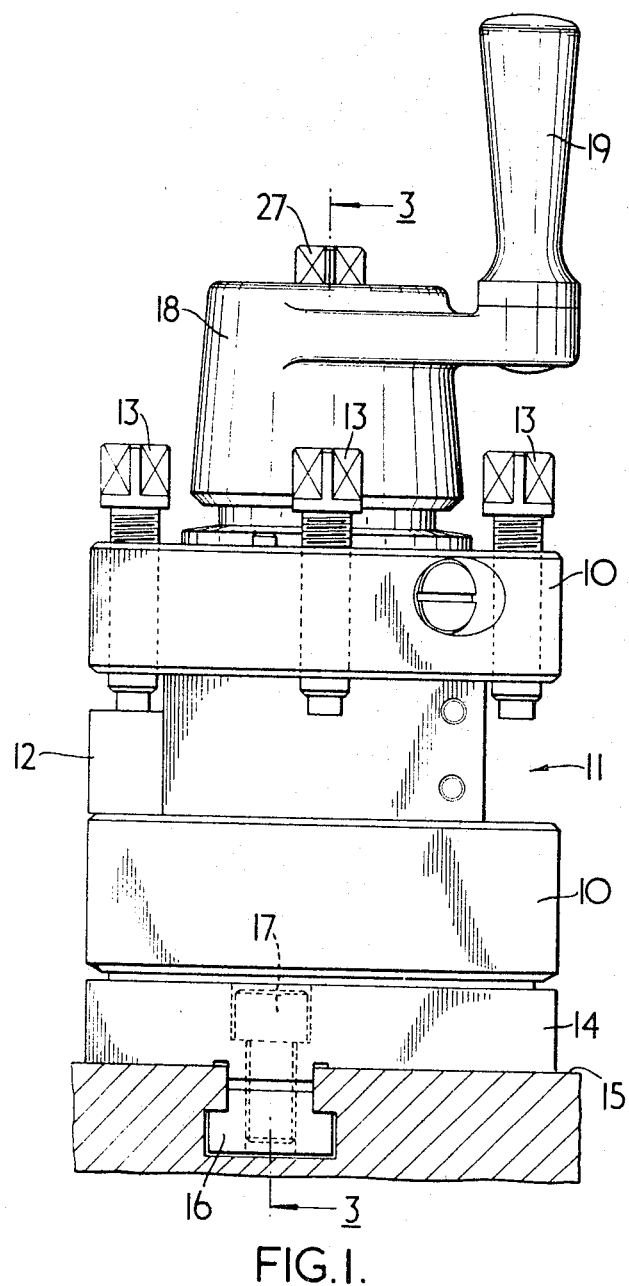

Referring firstly to FIGURE 1 the turret includes a four-sided tool holder 10 with four lateral channels 11 in which tools, one of which is shown at 12, are held by screws 13. The holder 10 is mounted, in a manner presently to be described, from a rectangular sole plate 14 which, in turn, is slidably mounted from a slide 15. For this latter purpose T-blocks 16 are supported by screws 17 from the sole plate and work in a T-slot in the slide. By turning screws 17 the sole plate can be clamped in a desired position longitudinally of the T-slot. Above the tool holder is a hub 18 provided with an operating handle 19 for a purpose which will be explained later.

Hub 18, as shown in FIGURE 3, is keyed at 20 to a sleeve 21 having a splined, or serrated connection 23 with a shaft 24 held against downward relative displacement by a nut 25 and lock washer 26, and a screw 27 holds the hub in position. Below the splined connection 23 shaft 24 is keyed at 28 to an indexing ring 29, presently to be described, and after passing freely through a relatively rotatable cam ring 30, also to be presently described, has a clamping, screwthreaded connection 31 in a bore at the top of sole plate 14. Below the screwthreads shaft 24 is of reduced diameter and is axially serrated on its periphery as shown at 32. Its serrated lower end is also axially slit at 24a within a tubular end stop 33 provided with a lateral lug 34 arranged between end stops to limit rotational movement to 125 degrees in the example shown, but the arc of movement could be made to be larger. These end stops are provided by dowels 35a, 35b (see FIGURE 12) fast in the underside of a recess in the bottom of the sole plate. The axially-slitted bottom of shaft 24 contains a taper screw 39 to urge it into frictional contact with the interior of the end stop 33 and make it rotationally fast therewith.

Sole plate 14 is formed with cylindrical portions 14a, 14b, 14c with intermediate steps for purposes presently to be described, and the circular upper surface of portion 14a is provided, as shown in FIGURE 4, with three equi-angularly-spaced, parallel-sided, radial grooves 42 in each of which is a ball 43.

The underside of the rotatable cam ring 30 is provided with three equi-angularly-spaced, radial grooves 47 as shown in FIGURE 7 for coaction with the balls 43, each of the grooves 47, as can best be seen from FIGURE 6, having a step 48 at one side and a ramp 49 at the other. FIGURE 6 also shows a flat area 50 at the bottom of the groove for providing limited movement of the ball across it. The cam ring 30 is made axially fast with the tool holder 10 by being located between a shoulder 51 and a retaining ring 52. When relative rotation of the cam ring and sole plate occurs the interaction of the balls 43 and ramps 49 raise the cam ring, and with it the tool holder relatively to the sole plate.

The upper surface of the rotatable cam ring 30 is provided with three grooves 53 which are equi-angularly-spaced but are parallel to respective tangents as shown in FIGURE 5. The grooves 53 have steps 54 at one side and ramps 55 at the other, separated by flat areas 56 at the bottom, much in the same way as the grooves 47.

The grooves 53 are for selective coaction with a thimble-like plunger 57 which is supported in an axial bore in indexing ring 29 and urged in the downward direction by a loading spring 58. One side of the plunger is to coact with the step 54 of the selected groove 53 and its opposite side is formed with a ramp 60 to coact with the ramp 55 of the groove, the spacing between the step 54 and ramp 55 permitting limited movement of the plunger across the groove. The plunger 57 is housed in an open-ended bore in the indexing ring 29 and has an upper portion 57a which is urged upwardly by spring 58. A pin 62 engaging a slit in the plunger holds it against turning. The function of plunger 57 is to provide a uni-directional drive for the cam ring 30.

The indexing ring 29, which has an external peripheral channel 63, will now be further described with particular reference to FIGURES 8 to 11. The portion of the indexing ring above the channel 63 is provided with four peripheral detent recesses 64 with respective parallel side walls 64a, 64b (see FIGURES 8 to 11). These recesses are separated by lands 65, 66 with intervening cam surfaces 67, and is abutted by a superjacent thrust ring 68 for the lower race 69 of a ball-type thrust bearing of which the upper race 70 is acted upon by the bottom of the sleeve 21 in hub 18. A dirt-excluding ring 73 is held in position by screws (not shown) engaged in tool holder 10, and is provided with a piston ring 17 engaging within hub 18 to protect the bearing.

The surfaces 64, 65, 66, and 67 are for coaction with two diametrically-opposed, spring-pressed plungers 75 (see FIGURES 3 and 11) accommodated in recesses 76 in the upper flange of the tool holder. These radial plungers have longitudinal, parallel-sided grooves 77 for pins 78 which prevent the plungers from turning out of position. The plungers 75 are biased by spring 72 for shaped noses 79 to coact with surfaces 64, 65, 66 and 67 as hereinafter described, and in the position shown in FIGURE 3 a step 79a underlies thrust ring 68. The plungers 75 hold the work holder against axial movement except when indexing is taking place.

Angularly disposed between the spring-pressed plungers 75, but at a lower level, is a fixed plunger 80 held in position by a screwthreaded cap 81 in a bore 82 in the tool holder, and prevented from turning by a pin 83 extending through an axial slit 84.

Referring now to FIGURES 3 and 13, it will be seen that a toothed coupling ring 85 is supported by screws 86 and dowels 87 from the bottom of the tool holder, and that a coacting toothed coupling ring 88 is held by screws 89 and dowels 90 from the sole plate. These coupling rings are identical and have their teeth, which are radially-directed, facing each other. The number of teeth must be a multiple of the number of indexing stations, and in the example given there are twelve teeth for the four stations. Each tooth has outwardly divergent side walls 91 and 92 separated by a flat crest 93.

FIGURE 3 also shows that the tool holder is provided with a depending skirt 94 which closely surrounds cylindrical portion 14c of the sole plate with a piston ring 95 effecting a dirt seal between them.

Figure 2:
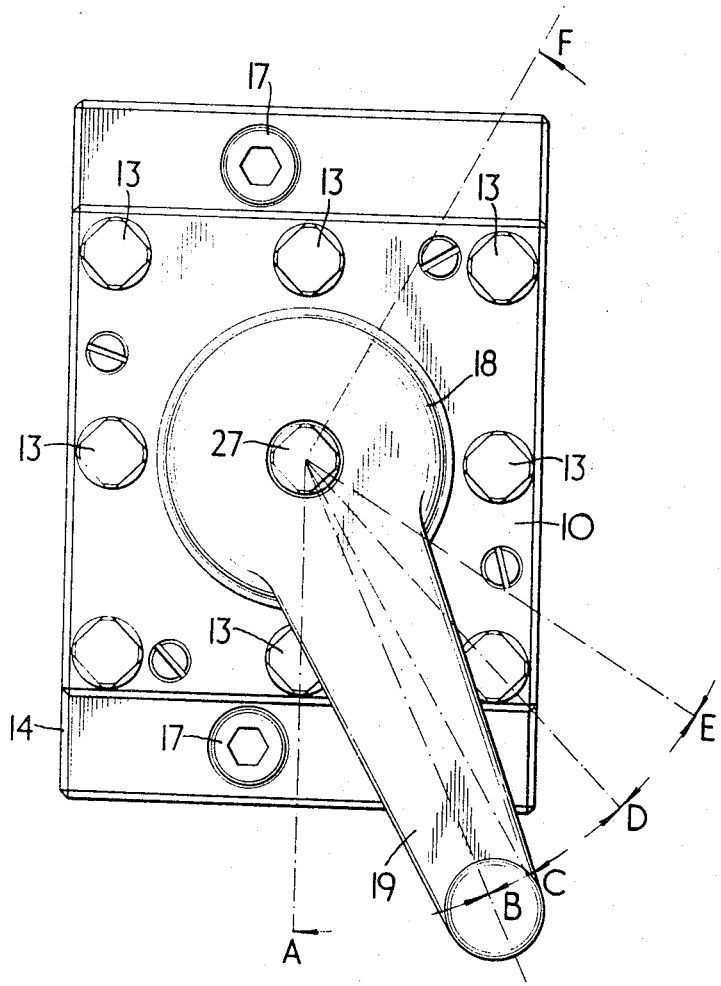

FIGURE 2 shows that the turret is operated to different conditions according to angular movements of handle 19. Thus, with the handle in its fully locking position it is in position B, which is 25 degrees from the vertical line A at the bottom of the said figure, and the parts are in the relative positions shown in FIGURE 3. That is to say, with the lug 34 of end stop 33 in firm engagement with dowel 35a, with the balls 43 within the grooves 47, with plunger 57 within the selected groove 53, with the movable plungers 75 within the cam surfaces 67 and in contact with the lower face of thrust ring 68, with the fixed plunger 80 within the peripheral channel 63 with the side walls 64a of the respective detent recesses 64 spaced 35 degrees away from the edges 80a of the plungers, and with toothed coupling rings 85 and 88 in engagement with each other. These parts are locked in these positions by the interaction of the screwthreads 31 between shaft 24 and sole plate 14.

During a movement of the handle through 5 degrees from position B to position C the frictional engagement of the screwthread 31 interconnecting shaft 24 and the sole plate 14 relaxes, and this relieves the pressure between the axially engaging parts (i.e., the thrust bearing 69 and 70, the thrust ring 68 and steps 79a of plungers 75, the sides of plungers 75 and the tool holder 10, and the toothed coupling rings 85 and 88). In these conditions the weight of the indexing ring 29, the thrust ring 68 and the bearing 69, 70 is sustained by a spring 100. At the same time the plunger 57 is moved by the rotation of shaft 24 to take up the slack between itself and the step 54 of the selected groove 53.

During turning of handle 19 through a further 15 degrees from position C to position D, the consequent rotation through the same angle of indexing ring 29 causes cam surfaces 67 to move plungers 75 radially outwards in readiness to ride up on to the peripheral lands 65, and plunger 57 to cause balls 43 to take up the slack in their coacting radial grooves 47 in cam ring 30 so as to establish a drive-transmitting relationship.

A further 15 degrees of movement of handle 19 from position D to position E causes plunger 57 to rotate cam ring 30 so that the interaction of balls 43 with the ramps 49 of radial grooves 47 lift the cam ring and, through retaining ring 52, also lift the tool holder 10. During this lifting movement the plungers 75, which are now in their radially-outward position, are raised on to the periphery of thrust ring 68 while the toothed coupling rings 85 and 88 at first hold the tool holder against rotation and then disengage to release it. The rotation from D to E also positions the fixed plunger 80 in alignment with the detent recesses 64, and the lifting movement raises the said fixed plunger into the said recesses with walls 64a and 80a in engagement to hold the indexing ring 29 rotationally fast with the tool holder 10.

The final rotation of handle 19 through 90 degrees from position E to position F causes the interengaging plunger 80 and recess 64 to index the tool holder through 90 degrees. In this position lug 34 engages the other dowel 35b and the elements which were raised now drop with the balls 43 engaging groove steps 48, and with plungers 75 engaging a land 65 of indexing ring 29 and with plunger 80 within the peripheral channel 63 of the said indexing ring 29.

At the end of this indexing movement the inertia of the tool holder is applied through the plunger 80 to one of the ramps 96, shown in FIGURE 10, of the indexing ring 29, and from the latter to shaft 24. Shaft 24 is then in a position in which the lug 34 of its end stop 33 is in engagement with dowel 35b, which latter absorbs the inertia and thereby protects the relatively delicate surfaces of the toothed coupling rings 85 and 88 from damage due to shock.

During the return movement of handle 19 from position F to position C plungers 75 follow the configuration of the rearwardly rotating indexing ring 29 and drop into cam surfaces 67 and under thrust ring 68. At the same time plunger 57 rides ratchet-wise over the top of cam ring 30, and just after position C is reached drops into the next groove 53. In these conditions the several parts have resumed their initial relative positions as shown in FIGURE 3, but with the tool holder held in its new indexed position. During the final five degrees movement from position C to position B the screw thread 31 locks the parts in the new indexed position.

What I claim as my invention and desire to secure by Letters Patent of the United States is:

1. A manually indexable turret, for a machine tool, comprising a tool holder, a sole plate and a manually-actuable hub, said tool holder disposed between said manually-actuatable hub and said sole plate, a shaft axially fast with said manually-actuable hub, said shaft extending coaxially through said tool holder and having a screw-threaded connection with said sole plate, an indexing ring and a cam ring arranged about said shaft intermediate said manually-actuable hub and said sole plate, said cam ring rotatably but non-slidably connected to said work holder, said indexing ring slidably but non-rotatively secured to said shaft, uni-directional drive means between said indexing ring and said cam ring to drive the latter, said indexing ring provided with indexing surfaces, first plunger means supported radially of said tool holder and adapted to coact with said indexing surfaces of said indexing ring to hold said work holder against axial movement, second plunger means supported radially of said tool holder and adapted to coact with said indexing surfaces of said indexing ring to rotate the latter, axially-acting means between said cam ring and said sole plate, axially-separable toothed clutch elements respectively fast with said tool holder and said sole plate, and a thrust ring between said manually-actuable hub and said indexing ring; a movement of said manually-actuable hub through a first arc causing the screw-threaded connection between said shaft and said sole plate to release a clamping pressure on the tool holder applied during a previous operation, a further movement of said hub through a second and contiguous arc rotating said indexing ring to disengage said first plunger means therefrom, a still further movement of said hub through a third and contiguous arc causing said axially-acting means to raise said tool holder relatively to said sole plate with a consequent disengagement of said axially-separable toothed clutch elements and with a consequent raising of the disengaged first plunger means to rest on said thrust ring, and a still further movement of said hub through a fourth and contiguous arc during which said second plunger means indexes said tool holder firstly to the next position and then frees it to drop for permitting said toothed clutch elements to re-engage axially for holding the tool holder in the new indexed position; a reverse rotation of said hub causing the screw-threaded connection between said shaft and said sole plate to restore the clamping pressure.

2. A manually indexable turret, according to claim 1, in which the indexing ring is keyed to the shaft whereby to enable it to slide, but not rotate relatively to said shaft.

3. A manually indexable turret, according to claim 1, in which the cam ring is located axially between a shoulder of the tool holder and a circlip fast with the tool holder so as to be rotatably, but not slidably connected to said tool holder.

4. A manually indexable turret, according to claim 1, in which the uni-directional drive means between the indexing ring and the cam ring comprises radiating grooves in the upper face of the cam ring and a plunger supported in the indexing ring parallel to the axis of the latter, said plunger biased by a spring into engagement with said cam ring grooves so as to communicate drive from said indexing ring to said cam ring in one direction, and said plunger formed with a ramp at its trailing side so as to be raised out of the engaged one of said cam ring grooves against its biasing spring when said cam ring is rotated relatively to said indexing ring to the next indexed position.

5. A manually indexable turret, according to claim 1, in which the axially-acting means between the cam ring and the sole plate includes radial grooves in the end of said cam ring adjacent said sole plate, radial grooves in the end of said sole plate adjacent said cam ring, said grooves in said sole plate having upright side walls, said grooves in said cam ring having one side wall formed as a ramp, respective balls in said grooves of said sole plate normally extending into said grooves of said cam ring whereby rotation of said cam ring in one direction relative to said sole plate will cause said ramps of said cam plate grooves to ride up said balls and raise said cam plate relatively to said sole plate.

6. A manually indexable turret, according to claim 5, in which the raising of the cam ring raises the tool holder so as to lift the first plunger means, when withdrawn from the indexing surfaces of the indexing ring, onto the periphery of the thrust ring whereby to free said indexing ring for rotation, but to leave the second plunger means engaged with said indexing surfaces so as to be in a position subsequently to turn the tool holder into the next indexed position.

7. A manually indexable turret, according to claim 1, in which the overall arc of oscillation of the shaft is determined by the interaction of a radial arm fast with said shaft with arcuately-spaced stops fast with the sole plate.

References Cited

UNITED STATES PATENTS

| | | | |
|---|---|---|---|
| 1,232,999 | 7/1917 | Tolles | 74—826 X |
| 2,547,616 | 4/1951 | Beekman | 74—826 X |
| 3,094,025 | 6/1963 | Diener | 82—36 |

LEONIDAS VLACHOS, *Primary Examiner.*

U.S. Cl. X.R.

74—826